Figure 1:
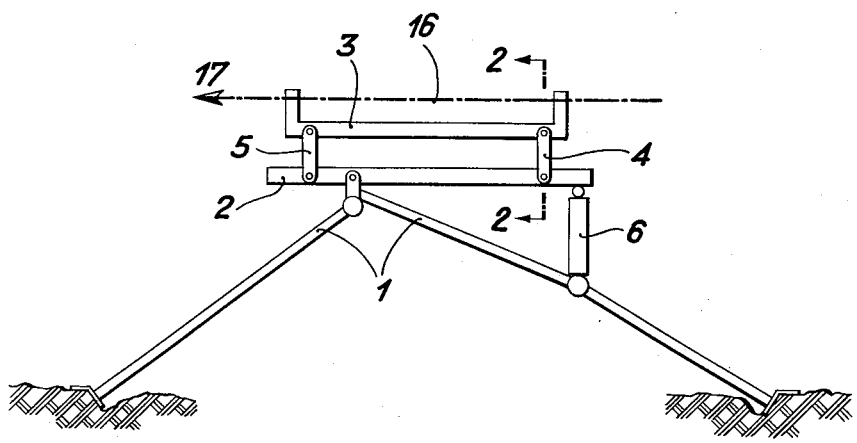

April 28, 1964        O. KELLER        3,130,641

OSCILLATORY MOUNTING, IN PARTICULAR FOR AUTOMATIC FIREARMS

Filed June 29, 1962

Inventor:
Otto Keller

By
Watson, Cole, Grindle & Watson
Attys.

United States Patent Office

3,130,641
OSCILLATORY MOUNTING, IN PARTICULAR FOR AUTOMATIC FIREARMS
Otto Keller, Bremen, Germany, assignor to Firma Rheinmetall G.m.b.H., Dusseldorf, Germany
Filed June 29, 1962, Ser. No. 206,394
Claims priority, application Germany July 5, 1961
5 Claims. (Cl. 89—44)

This invention relates to an oscillatory mounting, in particular for automatic firearms, having a cradle adjustable in the vertical and lateral directions and a supporting element serving to accommodate the weapon, said supporting element being coupled by way of pairs of links to the cradle and being able to swing out to the rear against the action of springs.

Mountings of this type are known, namely as weapon recoil damping devices, in which pairs of links disposed parallel to one another are arranged between the weapon and the understructure, so that a parallelogram-like articulated rectangle is produced which permits the weapon to perform recoil movements. Spring elements, such as, for example, tension springs or leaf-springs act as damping means for the recoil on each of the links of the individual pairs of links. The cost of constructing the joints and the spring mountings or supports on the individual links and the understructure, however, is rather high and if any individual spring weakens or fails there is a danger that owing to the spring forces acting unequally in that case the entire articulated rectangle will be twisted and become jammed.

It has also already been proposed to mount the links in joint pins in rubber bushes which, when the links swing out, are intended to supply the necessary restoring forces owing to their elastic deformation. It has been found, however, that in view of the great stresses produced by automatic firearms, the rubber bushes undergo very considerable and rapid wear and cannot supply the necessary restoring forces.

The object of the invention is to eliminate those drawbacks of the known devices and provide an oscillatory mounting in which the spring elements damping the recoil of the weapon are designed in a very simple manner from the point of view of manufacture and at the same time exhibit a maximum degree of reliability of operation.

According to the invention, this is achieved in that a common spring is associated with each pair of links of the oscillatory mounting. At the same time, it is extremely advantageous for the springs to take the form of torsion bar springs and for them to extend through the articulation pivots, mounted in the cradle, of a particular pair of links. In fact, in that case, the mounting of the torsion bar springs requires almost no additional parts and any fouling by sand, or the like or the formation of ice does not impair operation, whereby the danger of blocking of the recoil of the cradle, which exists for instance in particular in the case of exposed coil springs, is eliminated. Susceptibility to trouble with respect to external influences, for example damage due to blows or falling, and with regard to minor shell splinter damage is very slight.

The ends of the torsion bar springs are advantageously bent and are supported, on the one hand, against the cradle and, on the other hand, against one of the links of the relevant pair of links, this being best done so that each torsion bar spring has one of its bent ends mounted in a recess in the bearing sleeve, mounted in the cradle, of one of the links, for example of the left side as seen in the direction of firing, and has the other bent end mounted in a recess in the adjusting ring of the opposite link, for example on the right side as seen in the direction of firing, of the same pair of links. Moreover, transverse pins are arranged at the inner angles of the bent torsion bar springs when installed, said transverse pins preventing any shifting of the springs at right angles to the axis thereof.

Furthermore, it is advantageous to fit the torsion bar springs in a pre-tensioned state and, in fact, in certain cases under different and/or oppositely directly pre-tension, so that the necessary recoil for the weapon employed is obtained. In order to achieve this, the ends of the torsion bar springs can be bent in a direction swung through a torsion angle.

Figure 2:
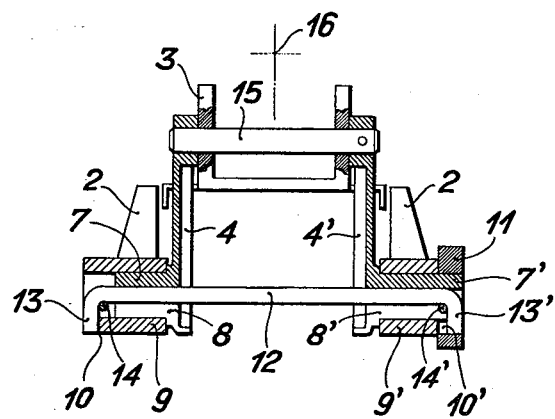

Further details of the invention will appear from the description of an example of embodiment illustrated in the drawing, in which:

FIG. 1 shows an oscillatory mounting according to the invention having a supporting element for mounting an automatic firearms (not shown), the oscillatory mounting being illustrated diagrammatically and in side view, and FIG. 2 is a section through a pair of links along the line 2—2 in FIG. 1.

The oscillatory mounting consists of legs 1 forming an under-mounting, a cradle 2 and a supporting element 3 serving to accommodate the weapon and which is articulated to the cradle 2 and the entire lower part of the mounting by way of two pairs of links 4, 4' and 5, 5'. Hence, an articulated rectangle is obtained which is formed by the cradle 2, the supporting element 3 and the front and rear pairs of links 4, 4' and 5, 5', respectively. Between the under-mounting and the cradle 2, devices 6 are arranged for adjusting the elevation and direction of the cradle 2.

The links in a pair of links, for example, 4, 4' are provided in their lower portion, as shown in FIG. 2, with slotted trunnion pins 7, 7' by which they are mounted in bearing sleeves 9, 9' of the cradle 2. There is arranged in each case within the coaxial slots 8, 8' in the trunnion pins 7, 7' of a pair of links 4, 4' a torsion bar spring 12 the two ends 13, 13' of which are bent at right angles. One end 13 is supported directly against the cradle 2, namely in a recess 10 in the bearing sleeve 9, and the other end 13' against the link 4', namely in a recess 10' in the adjusting ring 11 fixed to the pin 7'. In that way, the result is obtained that, on a swinging motion of the links 4, 4' about the trunnion pins 7, 7', the torsion bar spring 12 is subjected to torsional stresses and produces the desired restoring force. At the inner angles of the bent fitted torsion bar spring 12 there are also arranged two transverse pins 14, 14', as shown in the drawing, said transverse pins preventing any shifting of the torsion bar spring 12 at right angles to the axis thereof and connecting the adjusting ring 11 rigidly with the trunnion pin 7'.

The links 4, 4' are mounted in the supporting element 3 of the oscillatory mounting by means of a common articulation pin 15. The reference 16 in the drawing designates the axis of the weapon and the reference 17 the direction of fire.

FIG. 2 of the drawing shows the adjusting ring 11 arranged on the trunnion pin 7' and is held by the transverse pin 14'. Thus, one end 13 of the bar spring 12 is held in the recess 10 of the bearing sleeve 9 and thereby to the cradle 2, whereas, the other end 13' of the spring 12 projects into the recess 10' which is provided in the adjusting ring 11 on the trunnion pin 7'. To change or adjust the tension of the torsion spring 12, one must remove the pin 14', the ring 11 is turned slightly and then the pin 14' is again inserted, whereby, for this purpose two or three holes are provided in the adjusting ring 11.

The invention is not limited to the example of embodiment described and illustrated in the drawing. It also covers the equivalent application of the principle embodied therein in mountings of other design and other type.

What I claim is:

1. An oscillatory mounting support for automatic firearms mounted in a cradle comprising at least two pairs of links secured to the cradle and being moveable relatively thereto, a bearing sleeve for each link mounted on the cradle, and a torsion bar spring associated with each pair of links, mounted and extending through the sleeves of each pair, each end of the torsion bar spring being bent at approximately right angles and supported at one end against the cradle and at the other end against one of the links of the respective pair of links.

2. An oscillatory mounting support according to claim 1, in which an adjusting ring is provided fixedly connected to one of the sleeves, one of the bent ends of the bar spring being mounted in a recess in the bearing sleeve which is mounted in the cradle for one of the links and the other bent end being mounted in a recess in the adjusting ring of the opposite link of the same pair of links.

3. An oscillatory mounting support according to claim 1, in which an adjusting ring is provided fixedly connected to one of the sleeves, one of the bent ends of the bar spring being mounted in a recess in the bearing sleeve which is mounted in the cradle for one of the links, and the other bent end being mounted in a recess in the adjusting ring of the opposite link of the same pair of links, and in which transverse pins are provided one in each sleeve and arranged in the bends of each torsion bar spring to prevent shifting of the springs at right angles to the axis thereof and one of the pins connects the adjusting ring with its associated bearing sleeve.

4. An oscillatory mounting support according to claim 1, in which the torsion bar spring is pre-tensioned before it is fitted into the bearing sleeves.

5. An oscillatory mounting support according to claim 1, in which the torsion bar spring is pre-tensioned before it is fitted into the bearing sleeves by oppositely directed pre-tension.

References Cited in the file of this patent

UNITED STATES PATENTS 2,439,105 Sanford et al. _____ Apr. 6, 1948

FOREIGN PATENTS 364,914 Great Britain _____ Jan. 14, 1932
48,862 Germany _____ Oct. 4, 1889